(12) United States Patent
Hansotte et al.

(10) Patent No.: US 10,866,426 B2
(45) Date of Patent: Dec. 15, 2020

(54) SCANNING MIRROR DISPLAY DEVICES

(71) Applicant: Apple Inc., Cupertino, CA (US)

(72) Inventors: Eric J. Hansotte, Morgan Hill, CA (US); Byron R. Cocilovo, San Jose, CA (US); Se Baek Oh, Millbrae, CA (US); Seyedeh Mahsa Kamali, Cupertino, CA (US); Francesco Aieta, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/277,875

(22) Filed: Feb. 15, 2019

(65) Prior Publication Data

US 2019/0265486 A1 Aug. 29, 2019

Related U.S. Application Data (60) Provisional application No. 62/636,530, filed on Feb. 28, 2018.

(51) Int. Cl.
*G02B 26/10* (2006.01)
*F21V 8/00* (2006.01)
(Continued)

(52) U.S. Cl.
CPC ....... *G02B 27/0176* (2013.01); *G02B 5/1861* (2013.01); *G02B 5/1871* (2013.01);
(Continued)

(58) Field of Classification Search
CPC .............................. G02B 6/0016; G02B 6/0056
See application file for complete search history.

(56) References Cited

U.S. PATENT DOCUMENTS

| 5,887,009 | A | 3/1999 | Mandella et al. |
| 6,687,036 | B2 | 2/2004 | Riza |

(Continued)

FOREIGN PATENT DOCUMENTS

| WO | 2010034885 A1 | 4/2010 |
| WO | 2016146963 A1 | 9/2016 |
| WO | 2017193012 A1 | 11/2017 |

OTHER PUBLICATIONS

Xiang et al., Nanoscale liquid crystal polymer Bragg polarization gratings, Optics Express, Aug. 7, 2017, 11 pages, vol. 25.

(Continued)

*Primary Examiner* — Omar R Rojas
(74) *Attorney, Agent, or Firm* — Treyz Law Group, P.C.; G. Victor Treyz; Michael H. Lyons (57) ABSTRACT

An electronic device may have a light source such as a laser light source. The light source may emit light into a waveguide. A phase grating may diffract the light that is emitted into the waveguide to produce diffracted light. The diffracted light may be oriented parallel to a surface normal of an angled edge of the waveguide and parallel to a surface normal of a microelectromechanical systems mirror element in a two-dimensional scanning microelectromechanical systems mirror that is coupled to the edge of the waveguide. A wave plate may be interposed between the mirror and the edge of the waveguide to change the polarization state of light reflected from the mirror element relative to incoming diffracted light from the phase grating. The phase grating may be configured so that the reflected light is not diffracted by the phase grating.

20 Claims, 8 Drawing Sheets

(51) Int. Cl.
  *G02B 5/18*  (2006.01)
  *G02B 27/01* (2006.01)
(52) U.S. Cl.
  CPC ........... *G02B 6/005* (2013.01); *G02B 6/0016* (2013.01); *G02B 6/0031* (2013.01); *G02B 6/0056* (2013.01); *G02B 26/101* (2013.01); *G02B 27/0172* (2013.01); *G02B 2027/015* (2013.01); *G02B 2027/0112* (2013.01)

(56) References Cited

U.S. PATENT DOCUMENTS

| | | |
|---|---|---|
| 2003/0128917 A1 | 7/2003 | Turpin et al. |
| 2009/0067774 A1 | 3/2009 | Magnusson |
| 2010/0079865 A1* | 4/2010 | Saarikko .............. G02B 6/0016 359/566 |
| 2014/0140654 A1* | 5/2014 | Brown ...................... G02F 1/29 385/10 |
| 2015/0205126 A1 | 7/2015 | Schowengerdt |
| 2016/0033698 A1 | 2/2016 | Escuti et al. |

OTHER PUBLICATIONS

Bykovskii Y A et al.: "Surface Waves in Integrated-Optics Elements With Distributed Coupling (Review)", Soviet Journal of Quantum Electronics, Nov. 9, 2017, vol. 8, No. 11, pp. 1297-1309, XP001032048, American Institute of Physics, New York, NY, US, ISSN: 0049-1748.

Nicolas Bonod et al.: "Diffraction gratings: from principles to applications in high-intensity laser", Advances in Optics and Photonics, Mar. 31, 2016, vol. 8, No. 1, p. 156, XP055422257.

* cited by examiner

SCANNING MIRROR DISPLAY DEVICES

This application claims priority to U.S. provisional patent application No. 62/636,530 filed Feb. 28, 2018, which is hereby incorporated by reference herein in its entirety.

BACKGROUND

This relates generally to electronic devices, and, more particular, to electronic devices that display images.

Electronic devices such as head-mounted devices contain displays. The displays may be used in displaying computer-generated virtual reality and mixed reality content. If care is not taken, however, such systems may be overly complex, bulky, and uncomfortable to wear.

SUMMARY

An electronic device may have a light source such as a laser light source. The light source may emit light into a waveguide. A phase grating may diffract the light. Diffracted light may pass through an angled edge of the waveguide to a mirror element in a scanning mirror system that is coupled to the edge of the waveguide.

A wave plate may be used to change the polarization state of light reflected from the mirror element relative to incoming diffracted light from the phase grating. The phase grating may be configured to be polarization sensitive so that reflected light of a particular polarization is not diffracted by the phase grating. Alternatively, a reflective polarizer may be interposed between the phase grating and the waveguide.

The phase grating may be a Bragg polarization grating, an overmodulated transmission grating, a reflection or transmission volume hologram, or other suitable phase grating.

During operation, control circuitry may dynamically adjust the intensity and color of light emitted by the light source while controlling the two-dimensional scanning of the mirror element. The reflected light from the mirror is guided along the waveguide to an output coupler. The output coupler directs the reflected light to an eye box, so that a user's eye in the eye box receives an image corresponding to the output produced by the scanning mirror and light source. The output coupler and light guide may be transparent, which allows the user to view real-world objects while viewing the images overlaid on top of the real-world objects.

DETAILED DESCRIPTION

Figure 1:
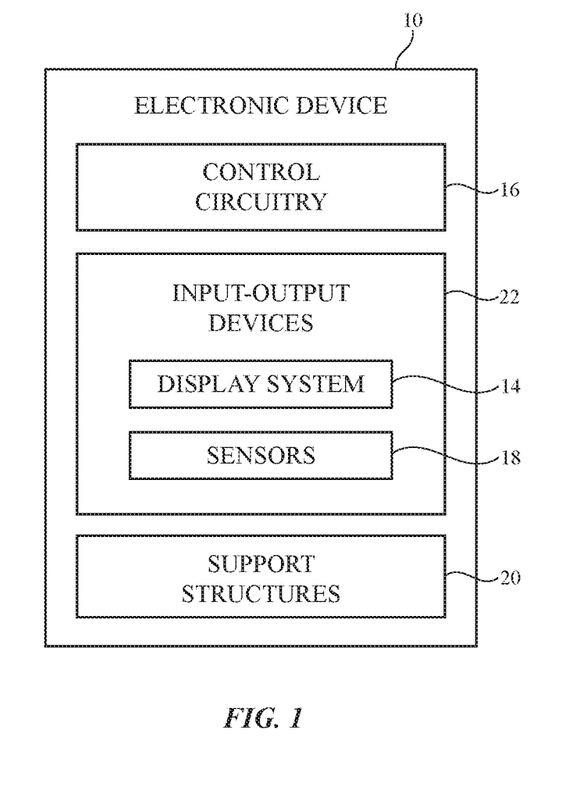
FIG. 1 is a schematic diagram of an illustrative electronic device in accordance with an embodiment.

An illustrative electronic device of the type that may be provided with a display system is shown in FIG. 1. Electronic device 10 may be configured to be worn by a user (e.g., device 10 may be a head-mounted device) or other suitable electronic equipment (e.g., a cellular telephone or other portable equipment). As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 22 may be used to allow data to be supplied to device 10 and to allow data to be provided from device 10 to external devices. Input-output devices 22 may include sensors 18 and other components for gathering input and/or providing a user with output. Sensors 18 in input-output devices 22 may include strain gauge sensors, proximity sensors, ambient light sensors, touch sensors, force sensors, temperature sensors, pressure sensors, image sensors, gaze tracking sensors, three-dimensional sensors, gesture sensors, magnetic sensors, accelerometers, gyroscopes and other sensors for measuring orientation (e.g., position sensors, orientation sensors), microelectromechanical systems sensors, and other sensors. Sensors 18 may be light-based sensors (e.g., proximity sensors or other sensors that emit and/or detect light), capacitive sensors (e.g., sensors that measure force and/or touch events using capacitance measurements). Strain gauges, piezoelectric elements, capacitive sensors, and other sensors may be used in measuring applied force and can therefore be used to gather input from a user's fingers or other external source of pressure. Sensors 18 and other input-output devices 22 may gather user gesture input, user touch input, user force input, button press input from a user, or other user input. If desired, sensors 18 may include microphones to gather audio signals (e.g., user voice commands). Devices 22 may also include other components for providing a user with output and for gathering input from a user and/or the environment surrounding device 10. For example, devices 22 may include buttons, joysticks, scrolling wheels, touch pads, key pads, keyboards, microphones, speakers, tone generators, vibrators (e.g., piezoelectric vibrating components, etc.), cameras, light-emitting diodes and other status indicators, data ports, etc. A user can control the operation of device 10 by supplying commands through input-output devices 22 and may receive status information and other output from device 10 using the output resources of input-output devices 22. In some configurations, a remote control or other accessor that is linked to device 10 via a wired or wireless communications path may be used in providing input to device 10.

Input-output devices 22 may include one or more display systems such as display system (display) 14. Display system 14 may be based on any suitable display technology. With one suitable arrangement, which is sometimes described herein as an example, display system 14 includes a scanning mirror. The scanning mirror may be a microelectromechanical systems mirror having a microelectromechanical systems mirror element that can be deflected or may be a galvanometer mirror (e.g., an electromagnetically controlled mirror). The scanning mirror may be a two-dimensional mirror with a mirror element that can be deflected about two orthogonal axes or may include a pair of one-dimensional scanning mirror devices (as examples).

A light source such as a laser or other source of light may produce light that is deflected by the mirror. An optical system based on a waveguide may be used to direct light from the light source to the scanning mirror and from the scanning mirror to an eye box associated with the eye(s) of a viewer. Display system 14 may be mounted in head-mountable support structures 20 (e.g., helmets, hats, goggles, eye glasses, or other structures that are mounted on a head of a user).

FIGS. 2, 3, 4, 5A, and 5B are top views of illustrative display systems for use in an electronic device such as device 10 of FIG. 1.

Figure 2:
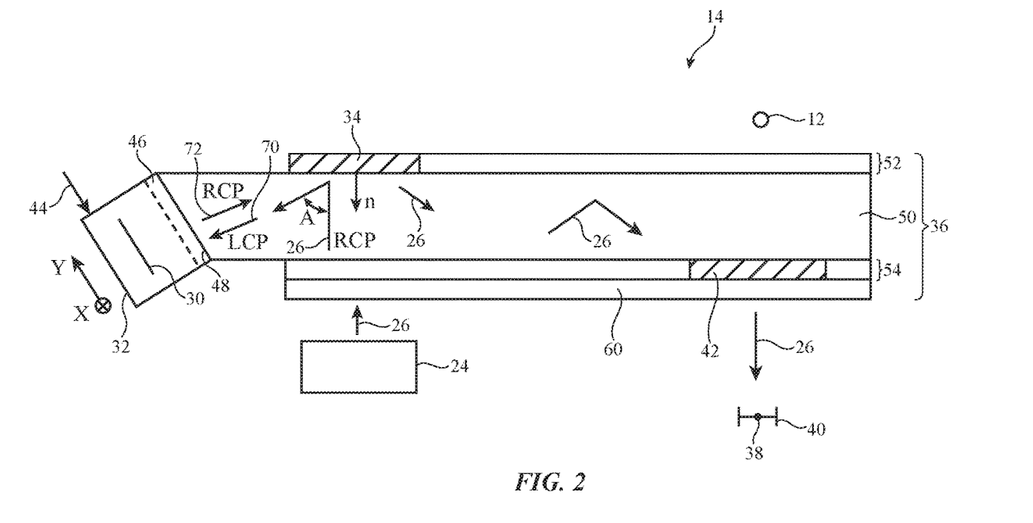
FIGS. 2, 3, 4, 5A, and 5B are diagrams of illustrative display systems for electronic devices in accordance with embodiments.

As shown in FIG. 2, display system 14 may include a light source such as light source 24. System 14 may also have a waveguide such as waveguide 36 that has a transparent waveguide substrate layer such as layer 50 (e.g., a layer of clear glass or polymer). Light source 24 may include one or more components such as light-emitting diodes or lasers that produce light 26 and associated optical components (e.g., lenses, fibers, etc.) for producing a collimated beam of light 26. With one illustrative configuration, light source 24 includes lasers of different colors such as red, green, and blue lasers that produce a collimated output beam of light 26. Light 26 is directed onto mirror element 30 (e.g., a microelectromechanical systems mirror element) of two-dimensional scanning mirror 32 (e.g., a two-dimensional scanning microelectromechanical systems mirror) by phase grating 34. Light 26 then reflects from mirror element 32 and is confined within waveguide 36 by total internal reflection until being coupled towards viewer eye 38 in eye box 40 by output coupler 42. Output coupler 42 and waveguide 36 are transparent, which allows a user (viewer eye 38) to view real-world objects such as real-world object 12 while simultaneously viewing images from output coupler 42 that are overlaid on portion of the real-world objects (e.g., mixed reality content can be provided to the user).

During operation, mirror element 32 may be tilted dynamically about the X and Y axes of FIG. 2 in response to control signals from control circuitry 16 at input 44. At the same time, the color (and intensity) of beam 26 can be adjusted dynamically by control circuitry 16 by varying the relative contribution of the output light from each of the differently colored lasers in light source 24. This allows an image made up of individually colored pixels (e.g., a computer-generated image to be overlaid on real-world images) to be presented to eye box 40 and viewer's eye 38 in eye box 40. Device 10 may include two display systems 14—one for the user's left eye and one for the user's right eye. The system components associated with a single eye are shown in FIG. 2.

In the illustrative configuration of FIG. 2, phase grating 34 is a thick phase grating such as a Bragg polarization grating (e.g., a thick polarization grating with a thickness d much larger than its pitch A and/or with a value of Q that is greater than 10 or other suitable value, where Q is given by equation 1).

$$Q = 2\pi \lambda d / n \Lambda \quad (1)$$

In equation 1, $\lambda$ represents the wavelength of light 26 and n is the refractive index.

In this type of configuration, light 26 from source 24 is diffracted towards scanning mirror 32 at an angle A with respect to surface normal n of grating 34. The value of A may be at least 40°, at least 50°, 50-70°, or other suitable value. A wave plate such as wave plate 46 may be interposed between scanning mirror 32 and angled surface 48 of waveguide 36 or a wave plate such as wave plate 46 may be located at other suitable locations between grating 34 and mirror 32. Surface 48 may be characterized by a surface normal that is oriented at a non-zero angle with respect to the longitudinal axis of waveguide 36 and a non-zero angle with respect to surface normal n (e.g., the edge of waveguide 36 may have a surface normal that is oriented at a non-zero angle such as an angle of between 10° and 80° with respect to the surface normal n associated with the Bragg polarization grating).

Angled surface 48 may have a surface normal parallel to incoming light 70. The angular orientation of surface 48 may be selected to help direct reflected light 72 with a desired angular orientation. The angular orientation of reflected light 72 may be chosen to support a wide range of angles of reflected light while ensuring this light is refractively coupled into waveguide 36 from mirror 32 and is guided within waveguide 36. In particular, the angle of surface 48 may be chosen to allow light with a maximum range of reflected angles to be refractively coupled through the edge of element 50 and guided along the length of waveguide 36 in accordance with the principle of total internal reflection. In an illustrative arrangement, the surface of mirror 32 may be parallel to surface 48 when mirror 32 is at the center of its nominal scan range and the incoming light from grating 34 is normally incident on surface 48. This type of arrangement allows for a relatively large amount of reflected beam area when mirror 32 is at the nominal center of its scan range. Other arrangements may be used, if desired.

In some configurations, grating 34 may be formed in photopolymer layer 52 (e.g., a polymer layer such as a liquid crystal polymer layer whose index of refraction can be locally changed by light exposure during a laser grating writing operation). Output coupler 42 may be a phase grating formed in photopolymer layer 54.

If desired, photopolymer layer 54 may be covered by a cover layer such as cover layer 60 to help protect layer 54. Layer 60 may be formed from glass or polymer. A cover layer (e.g., a cover layer such as layer 60 formed of glass or polymer) may also be used to cover and protect layer 52. The thickness of the cover layer(s) such as layer 60 may be about 0.3 mm, at least 0.05 mm, less than 0.7 mm, or other suitable thickness. The thickness of photopolymer layer 54 (and layer 52) may be 5-500 microns, at least 2 microns, at least 5 microns, at least 10 microns, less than 1000 microns, or other suitable thickness. The thickness of waveguide layer 50 may be 0.5 to 1.5 mm, at least 0.2 mm, at least 0.4 mm, less than 2 mm, or other suitable thickness.

In configurations for system 14 in which grating 34 is a polarization grating, grating 34 exhibits polarization-sensitive diffraction properties (i.e., grating 34 preferentially diffracts light of a particular polarization). Grating 34 is preferably configured to diffract most of the light that is incident on grating 34 in a single order (in addition to the zero-order mode where there is no diffraction), thereby enhancing efficiency (e.g., at least 80% of incident energy may be diffracted into a single order, at least 90%, etc.). Furthermore, the diffracted light will often be in a different polarization state than that which was incident on the grating. Light source 24 may include optical fibers, lenses, wave plates, and/or other optical elements to help control beam size and polarization for light 26 as light 26 is emitted from light source 24.

In the example of FIG. 2, light 26 is initially right-hand circularly polarized and grating 34 is configured to efficiently diffract incoming right-hand circularly polarized light towards mirror 32 in direction 70 at angle A with respect to surface normal n of grating 34 as left-hand circularly polarized light. This diffracted light 26 then reaches mirror 32 (e.g., at a nominally 90° angle relative to the surface of element 30). Light 26 reflects from mirror 32 in direction 72 (e.g., as right-hand circularly polarized light), which is not diffracted by grating 34 upon return and therefore is guided along the interior of waveguide 36 in accordance with the principle of total internal reflection. Upon reaching output coupler 42, light 26 is coupled out of waveguide 36 towards eye box 40. Optional wave plate 46 may be configured to adjust the polarization state of the light reflected from mirror 32 to ensure that diffraction losses of light 26 upon reaching grating 34 are minimized. In the example of FIG. 2, grating 34 is a reflective Bragg polarization grating, but grating 34 may also be configured as a transmissive Bragg polarization grating. The light diffracted from grating 34 may not necessarily be in the orthogonal polarization state to that which is incident (as in this example with incident right-hand circularly polarized light and diffracted left-hand circularly polarized light). For example, after diffracting or reflecting from an optical element, linearly polarized or circularly polarized light may become elliptically polarized. In general, the wave plate 46 on surface 48 or other suitable location between grating 34 and mirror 32 is configured such that the polarization sate of the returned light, having passed through the wave plate multiple times, is such that it is minimally diffracted by the grating over a desired range of angles and thus propagates along waveguide 36 in accordance with the principle of total internal reflection. In some arrangements, wave plate 46 may be omitted or may be configured to perform only a relatively weak "cleanup" function (e.g., adjusting elliptically polarized light that has reflected from mirror 32 back to a desired circular or linear polarization state).

Figure 3:
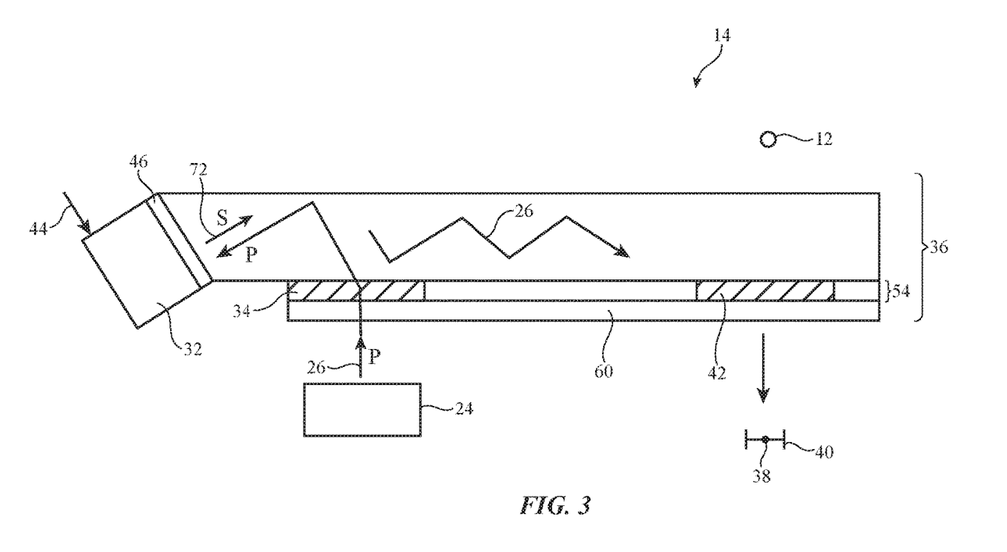

In the illustrative configuration of FIG. 3, phase grating 34 is a transmission polarization grating such as an overmodulated volume phase transmission grating in which the index of refraction modulation and thickness of the grating are configured so that the grating is overmodulated and s-polarization diffraction efficiency is 0% while p-polarization diffraction efficiency is 100%. Light 26 is emitted from light source 24 with a polarization state that is efficiently diffracted by grating 34. For example, light 26 may be emitted from light source 24 with a p polarization. Grating 34 may be configured to diffract a large amount (e.g., at least 80%, at least 90%, or other suitable amount) of incident p-polarized light 26 into a single diffraction order (e.g., at angle A with respect to surface normal n of grating 32). The value of angle A may be at least 40°, 50-70°, or other suitable value. The diffracted p-polarized light at angle A reflects from the interior of waveguide 36 and passes through wave plate 46 to mirror 32 (or, if desired, passes directly to mirror 32 through wave plate 46). Light 26 then reflects from mirror 32. Wave plate 46 may be a quarter wave plate, so that light 26 is rotated in polarization from a first polarization state (e.g., p-polarization) to a second polarization state (e.g., s-polarization) after passing through quarter wave plate 46 to mirror 32 and back. Grating 34 is tuned to diffract p-polarized light and not s-polarized light, so the s-polarized light that is reflected in direction 72 is not diffracted by grating 34 and is reflected internally in waveguide 36 in accordance with the principle of total internal reflection. Output coupler 42 couples light 26 out of waveguide 36 towards eye box 40.

Figure 4:
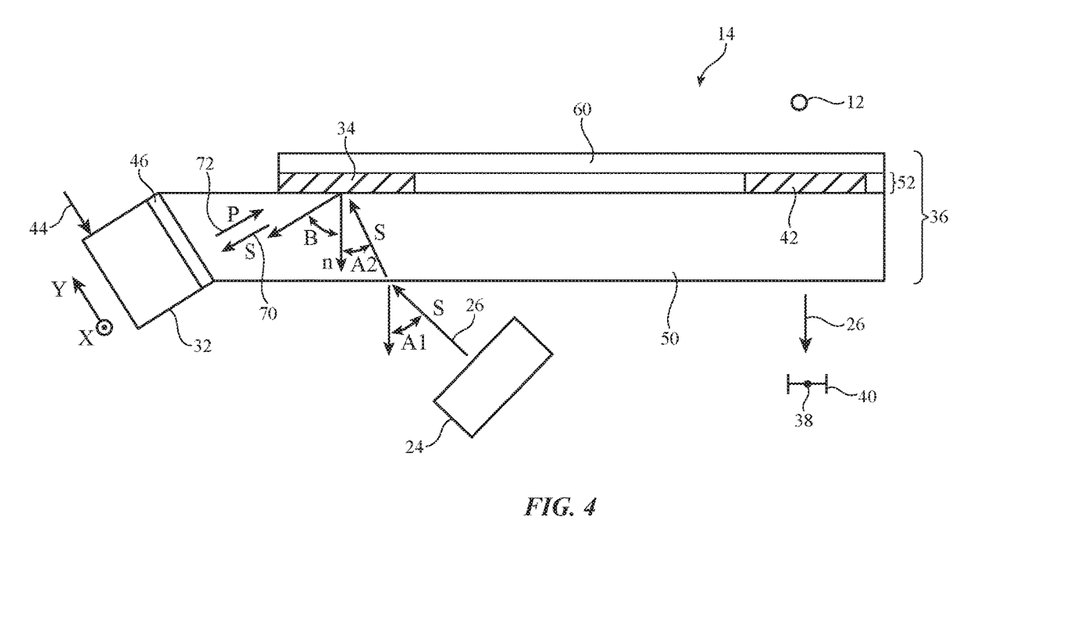

In the illustrative configuration of FIG. 4, light source 24 emits light 26 at an angle A1 with respect to surface normal n of grating 34 (e.g., a volume grating). Incident angle A1 is chosen so that incident angle A2 plus the diffracted angle B is 90° (Brewster's condition is satisfied). In this arrangement, only s-polarized light is diffracted and thus the grating acts as a polarization grating to selectively diffract s-polarization and not p-polarization.

Initially, light 26 is s-polarized and is efficiently diffracted by grating 34 in direction 70 at an angle B with respect to surface normal n. Light 26 reflects from mirror 32 in direction 72. Wave plate 46 may be a quarter wave plate. As light 26 passes through wave plate 46 and back, the polarization state of light 26 rotates by 90° (becoming orthogonal to the original polarization state of light 26 from light source 24), so that light 26 that is traveling in direction 72 is p polarized and is not diffracted by grating 34. As a result, light 26 is confined within waveguide 36 by total internal reflection until reaching coupler 42. This Brewster's condition arrangement may use either a reflection grating (as shown in FIG. 4) or a transmission grating, as long as the sum of the incident and diffracted angles is 90° (Brewster's condition is satisfied).

If desired, system 14 may incorporate a reflective polarizer that overlaps grating 34 (e.g., a transmissive or reflective volume phase grating). This type of arrangement is shown in FIGS. 5A and 5B.

Figure 5A:
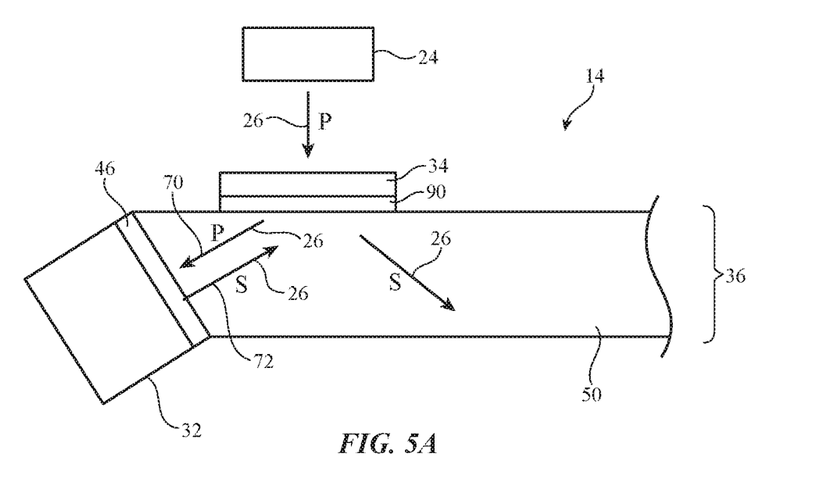

In the example of FIG. 5A, grating 34 is a transmission grating (e.g., a transmission volume hologram) that is configured to efficiently diffract light 26 in a single order (e.g., with an efficiency of at least 80%, at least 90%, etc.). Light 26 that is emitted by light source 24 may be s-polarized or p-polarized and is efficiently diffracted in direction 70 by grating 34 in the same polarization state. Reflective polarizer 90 is interposed between grating 34 and waveguide 36 and exhibits high reflection for a given polarization state (p-polarized or s-polarized) and high transmission for the opposite polarization state (respectively, s-polarized or p-polarized). Polarizer 90 and light source 24 are configured so that linearly polarized light (s-polarized or p-polarized) from light source 24 is passed towards mirror 32 by grating 34 and is transmitted through polarizer 90. After passing through quarter wave plate 46 and back (after reflecting from mirror 32), light 26 is rotated in polarization and is reflected by reflective polarizer 90. Light 26 is rotated to the orthogonal polarization from that originally incident on grating 34 and reflective polarization 90. The light reflected from mirror 32 does not reach grating 34 and therefore is not diffracted by grating 34. After reflecting from polarizer 90, light 26 is confined within waveguide 36 by total internal reflection until reaching coupler 42.

Figure 5B:
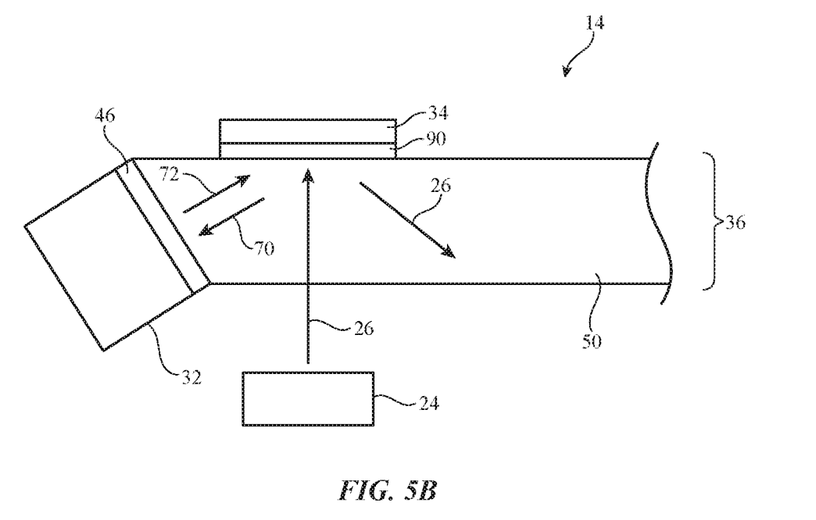

In the example of FIG. 5B, grating 34 is a reflective grating (e.g., a reflection volume hologram) that is configured to efficiently diffract light 26 of a first polarization state in a single order (e.g., with an efficiency of at least 80%, at least 90%, etc.) while not diffracting light 26 of a second (e.g., opposite) polarization state. The first polarization state may be, for example, s-polarization, p-polarization, right-hand circular polarization, etc. Quarter wave plate 46 may be used to convert light 26 from the first to second polarization state. With this arrangement, reflective polarizer 90, is configured to pass light of the first polarization state and reflect light of the second polarization state. Light from light source 24 has the first polarization state and passes through reflective polarizer 90 and is diffracted in direction 70 by grating 34. Reflected light 26 traveling in direction 72 has the second polarization state and is reflected from reflective polarizer 90 (and is not diffracted by grating 34). As a result, light 26 is confined within waveguide 36 by total internal reflection until reaching coupler 42.

The gratings 34 of FIGS. 5A and 5B may be any suitable gratings (Bragg polarization gratings, reflective or transmissive gratings, reflective or transmissive volume holograms, etc.).

Figure 6:
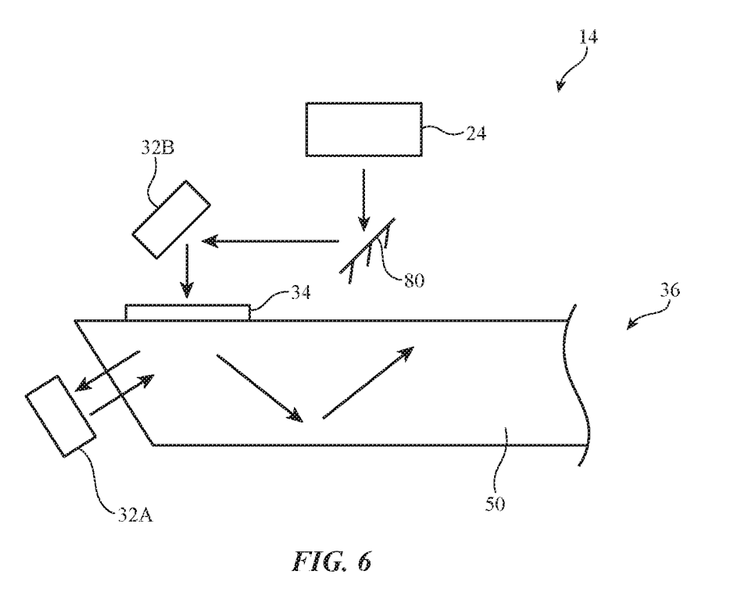
FIG. 6 is a diagram of an illustrative display system that may use a pair of single dimensional mirrors in accordance with an embodiment.

As shown in FIG. 6, scanning mirror 32 may be formed from two one-dimensional scanning mirrors 34A and 34B rather than a single two-dimensional scanning mirror. Light from light source 24 may be directed to first one-dimensional scanning mirror 32B (e.g., by mirror 80). Mirror 32B may perform one dimension of beam scanning on the light emitted by light source 24. A second dimension of beam scanning may be performed after the scanned beam from first mirror 32B reflects off of second one-dimensional scanning mirror 32A. If desired, light source 24, mirror 80, and mirror 32B may be replaced by a one-dimensional array of light emitters (e.g., light-emitting diodes or lasers). Moreover, mirror system 14 may also be formed from pairs of one-dimensional scanning mirrors that are located at different positions relative to waveguide 36. The arrangements of FIG. 6 is illustrative.

If desired, grating 34 may be a polarization grating formed from metasurface structures. Polarization grating 34 serves as a polarization grating coupler that decouples light input (transmission) and light output (reflection). In this system, polarization grating 34 performs double duty. In particular, grating 34 couples light into waveguide 36 with a specific angle in its transmission mode (blaze of first order), while also reflecting light back inside the waveguide over a wide range of angles in two dimensions ($\Delta\theta \sim \pm 20°$ & $\Delta\varphi \sim \pm 20°$) in its reflection mode.

Metasurfaces for grating 34 may be formed from an array of nanostructures such as silicon pillars or other structures. Metasurface polarization grating couplers formed in this way may be used to form grating 34 on waveguide 36 of system 14 or maybe used in other systems that involve coupling and reflecting light (e.g., different systems where a grating operates in transmission mode and reflection mode).

Metasurface polarization grating couplers may be configured to work independently under different polarizations (e.g., different linear polarization or different circular polarizations). Multiwavelength operation may be supported, if desired. For example, grating 14 may be configured to work independently for different linear polarizations for red, green, and blue light or may be configured to work independently for different circular polarizations for red, green, and blue light. Metasurface gratings may receive light 26 from light source 24 using an arrangement of type shown in FIG. 3 or 5A (e.g., an arrangement in which light 26 directly illuminates grating 34 from outside of waveguide 36) or using an arrangement of the type shown in FIG. 4 or 5B (e.g., an arrangement in which light 26 is coupled into the material forming waveguide 36 before illuminating the inner surface of grating 34).

Figure 7:
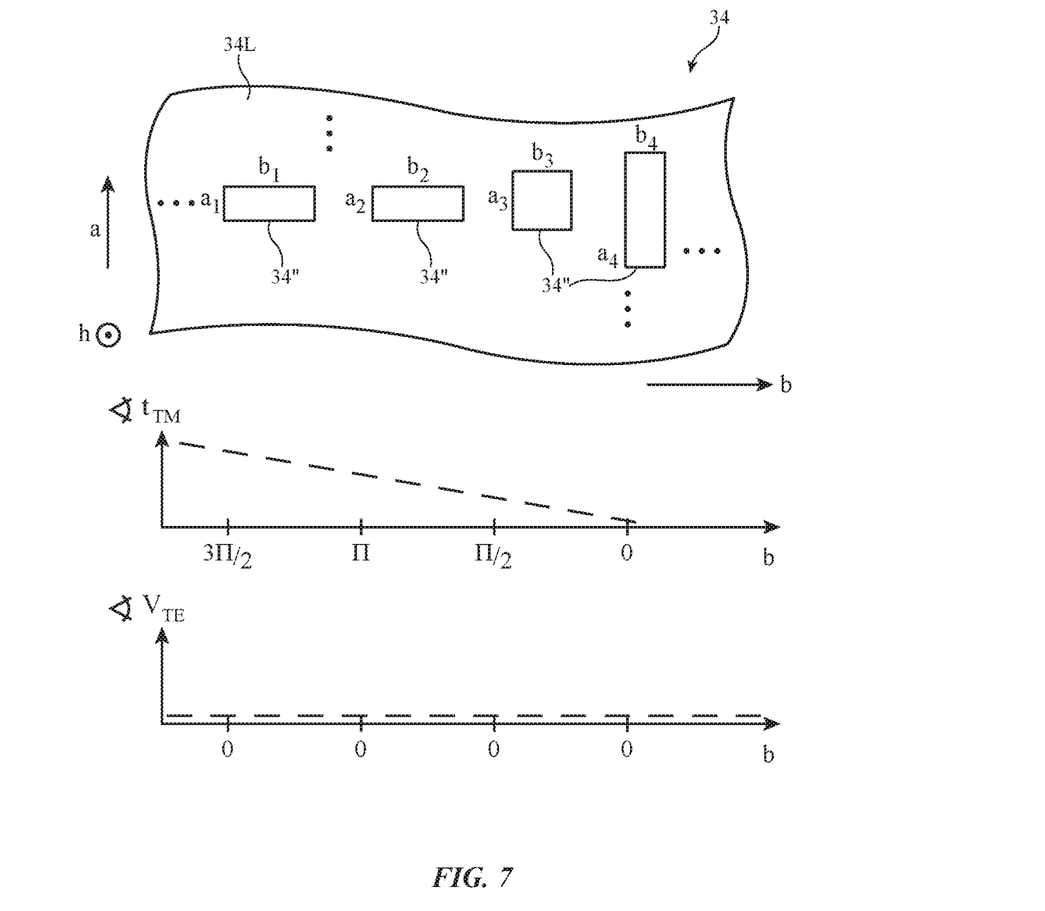
FIG. 7 is a diagram of an illustrative metasurface polarization grating coupler in accordance with an embodiment.

FIG. 7 is a top view of grating 34 formed from a metasurface structure (sometimes referred to as a metasurface grating). As shown in FIG. 7, metasurface grating 34 may have nanostructures 34" that extend in a two-dimensional array across the surface of waveguide 36 (e.g., in lateral dimensions a and b). Nanostructures 34" may be nanoposts (nanopillars) such as rectangular nanoposts or nanoposts of other shapes. The height H of nanostructures 34" (e.g., the size of nanostructures 34" measured along dimension h, which is oriented out of the page in FIG. 7) may be at least 200 nm, at least 400 nm, less than 800 nm, less than 500 nm, or other suitable size. Nanostructures 34" may be formed from any suitable material (e.g., semiconductors, organic and/or inorganic dielectrics, metals, other materials, and/or combinations of materials). As an example, nanostructures 34" may be formed from crystalline silicon, which has a high refractive index and is sufficiently transparent at visible wavelengths.

Nanostructures 34" may include different types of nanostructures that are organized in a random pattern without repeating elements or other irregular and non-periodic pattern or that are organized in a repeating pattern to form an array of nanostructures 34" for grating 34. In the example of FIG. 7, nanostructures 34" include four different types of nanostructures. The first type has dimensions a1 and b1 along lateral dimensions a and b, respectively. The second, third, and fourth types of nanostructures 34" have, respectively, dimensions (a2, b2), (a3, b3), and (a4, b4). In an illustrative configuration, a1 is about 45 nm, b1 is about 70 nm, a2 is about 80 nm, b2 is about 50 nm, a3 is about 100 nm, b3 is about 44 nm, a4 is about 125 nm, and b4 is about 42 nm, the value of h is about 360 nm, and grating 34 handles linearly polarized green light at 532 nm and a 30° illumination angle in transmission mode (as an example). Illustrative phase shifts associated with these four different types of nanostructures 34" in this example are shown by the traces in the two graphs of FIG. 7. Nanostructures 34" are configured so that, in a first polarization (e.g., TM), nanostructures 34" exhibit high (e.g., 100%) transmission and, as shown in FIG. 7, the different types of nanostructures 34" exhibit respective phase shifts of 0, $\pi/2$, $\pi$, and $3\pi/2$ (blaze first order). Nanostructures 34" are also configured so that in a second polarization (e.g., TE), nanostructures 34" exhibit high (e.g., 100%) reflection and, as shown in FIG. 7, exhibit phase shifts of 0 (blaze zeroth order). In general, grating 34 may be configured to have any suitable number of different nanostructures 34" and nanostructures 34" of any suitable dimensions, may be configured to handle, any desired wavelength(s) of light, may be configured to support any desired angles of operation, any desired polarizations, etc. The example of FIG. 7 is merely illustrative. In some configurations, nanostructures 34" may form a metagrating that induces a polarization conversion to incident light, i.e., from right-hand circularly polarized (or TM polarized) light the diffraction orders can be left-hand circularly polarized (or TE) and vice versa.

Figure 8:
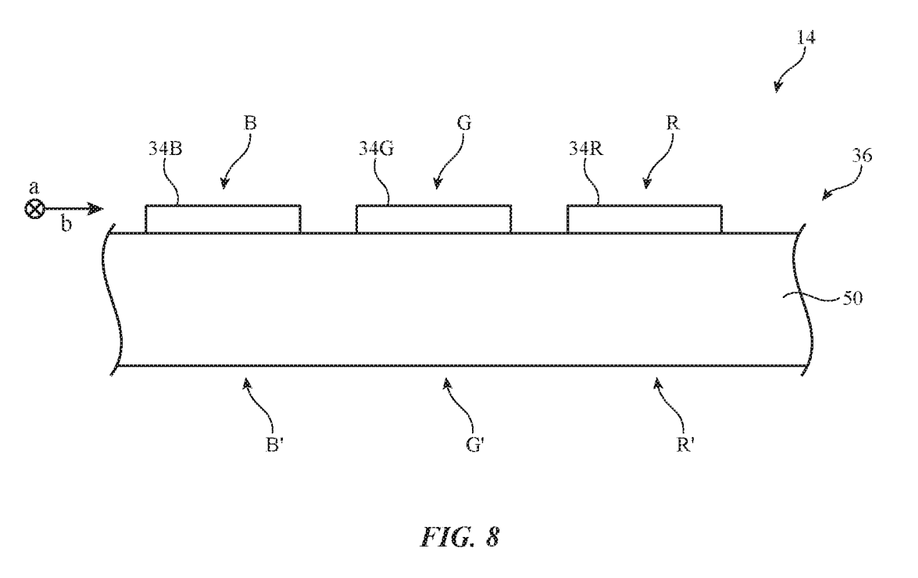
FIG. 8 is a diagram of an illustrative display system with couplers for different wavelengths in accordance with an embodiment.

FIG. 8 shows how multiple wavelengths of light 26 may be handled using multiple different gratings 34 (e.g., metasurface gratings, sometimes referred to as nanostructure gratings, or other suitable gratings). System 14 may have, for example, a blue grating 34B, a green grating 34G, and a red grating 34R that are formed at multiple different locations along the length of waveguide 36. In a first illustrative configuration, blue light B, green light G, and red light R are respectively applied to gratings 34B, 34G, and 34R from outside of layer 50 (e.g., using an arrangement of the type shown in FIG. 3 or FIG. 5A). In a second illustrative configuration, blue light B', green light G', and red light R' are respectively applied to gratings 34B, 34G, and 34R from inside of layer 50 (e.g., using an arrangement of the type shown in FIG. 2 or FIG. 5B).

In general, the metasurface of grating 34 may be configured to handle transmission or reflection modes of operation. For input, each metasurface may blaze the first order of the designed wavelength and blaze the zeroth order for the longer wavelength(s). For output, each metasurface may blaze the zeroth order for all the distinct wavelengths (red, green, and blue here).

Metasurfaces for grating 34 may be designed using nanostructure of any suitable sizes. Other optical elements such as collimators may be also be added using metasurface layers.

The foregoing is merely illustrative and various modifications can be to the described embodiments. The foregoing embodiments may be implemented individually or in any combination.

What is claimed is:

1. An electronic device, comprising:
    a waveguide having opposing first and second surfaces and an edge extending from the first surface to the second surface at a non-parallel angle with respect to the first surface;
    a light source configured to provide p-polarized light;
    an output coupler;
    an overmodulated transmission phase grating configured to diffract the p-polarized light from the light source to produce diffracted light having a first polarization that is transmitted through the first surface of the waveguide;
    a scanning mirror configured to receive the diffracted light through the edge of the waveguide and configured to reflect the diffracted light to produce reflected light, wherein the waveguide is configured to provide the reflected light to the output coupler, and wherein the output coupler is configured to direct light from the waveguide towards an eye box; and
    a wave plate, wherein the diffracted light passes through the wave plate to the scanning mirror, wherein the reflected light from the scanning mirror has a second polarization after passing through the wave plate to the waveguide.

2. The electronic device defined in claim 1 wherein the overmodulated transmission phase grating has an index of refraction modulation and thickness configured to exhibit 0% s-polarization diffraction efficiency and 100% p-polarization diffraction efficiency.

3. The electronic device defined in claim 1 further comprising:
    control circuitry configured to generate an image in the eye box by controlling the scanning mirror and the light source.

4. The electronic device defined in claim 1 wherein the light source comprises a laser light source and wherein the wave plate is between the scanning mirror and the edge of the waveguide.

5. The electronic device defined in claim 1 wherein the output coupler is configured to overlay, at the eye box, light from real-world objects with the light from the waveguide.

6. The electronic device defined in claim 1, wherein the output coupler comprises a phase grating.

7. The electronic device defined in claim 6, further comprising:
    a transparent cover layer; and
    a photopolymer layer interposed between the waveguide and the transparent cover layer, wherein the output coupler and the overmodulated transmission phase grating are formed within the photopolymer layer.

8. An electronic device, comprising:
    a waveguide having a surface and an edge that extends at a non-parallel angle with respect to the surface;
    a light source configured to provide light having a first polarization to the surface of the waveguide;
    an output coupler on the waveguide;
    a transmission phase grating configured to diffract the light from the light source to produce diffracted light having the first polarization;
    a scanning mirror that is configured to receive the diffracted light through the edge of the waveguide and that is configured to reflect the diffracted light to produce reflected light, wherein the waveguide is configured to provide the reflected light to the output coupler via total internal reflection and wherein the output coupler is configured to direct the reflected light towards an eye box; and
    a wave plate, wherein the diffracted light passes through the wave plate to the scanning mirror and wherein the reflected light from the scanning mirror has a second polarization after passing through the wave plate to the waveguide.

9. The electronic device defined in claim 8, wherein the transmission phase grating does not diffract light of the second polarization.

10. The electronic device defined in claim 8, wherein the first polarization comprises P-polarization.

11. The electronic device defined in claim 10, wherein the second polarization comprises S-polarization.

12. The electronic device defined in claim 8 further comprising:
    control circuitry configured to generate an image in the eye box by controlling the scanning mirror and the light source.

13. The electronic device defined in claim 12 wherein the light source comprises a laser light source and wherein the wave plate is between the scanning mirror and the edge of the waveguide.

14. The electronic device defined in claim 8 further comprising:
    a transparent cover layer; and
    a photopolymer layer interposed between the waveguide and the transparent cover layer, wherein the transmission phase grating and the output coupler are in the photopolymer layer.

15. An optical system comprising:
    a waveguide having opposing first and second surfaces and an edge extending from the first surface to the second surface;
    a light source configured to produce light;
    a transmissive diffraction grating at the first surface and configured to diffract the light produced by the light source to produce diffracted light, the second surface of the waveguide being configured to reflect the diffracted light towards the edge;
    an output coupler on the waveguide; and
    a scanning mirror at the edge, wherein the scanning mirror is configured to reflect the diffracted light back into the waveguide as reflected light, wherein the waveguide is configured to propagate the reflected light towards the output coupler via total internal reflection, and wherein the output coupler is configured to direct the reflected light towards an eye box.

16. The optical system defined in claim 15, wherein the transmissive diffraction grating is configured to diffract light of a first polarization with greater diffraction efficiency than light of a second polarization and wherein the light produced by the light source has the first polarization.

17. The optical system defined in claim 16, wherein the reflected light has the second polarization.

18. The optical system defined in claim 17, further comprising a waveplate interposed between the edge and the scanning mirror.

19. The optical system defined in claim 17, wherein the edge extends at a non-perpendicular angle with respect to the first and second surfaces.

20. The optical system defined in claim 15, wherein the edge extends at a non-perpendicular angle with respect to the first and second surfaces.

\* \* \* \* \*